United States Patent
Nishizawa et al.

(10) Patent No.: US 7,606,690 B2
(45) Date of Patent: Oct. 20, 2009

(54) METHOD AND APPARATUS FOR MODELING COIL SPRINGS USING A FORCE FIELD GENERATOR

(75) Inventors: Shinichi Nishizawa, Walled Lake, MI (US); Akihiko Kumagai, Sacramento, CA (US)

(73) Assignee: NHK International Corporation, Wixom, MI (US)

( * ) Notice: Subject to any disclaimer, the term of this patent is extended or adjusted under 35 U.S.C. 154(b) by 449 days.

(21) Appl. No.: 10/087,210

(22) Filed: Mar. 4, 2002

(65) Prior Publication Data

US 2003/0111309 A1 Jun. 19, 2003

Related U.S. Application Data

(60) Provisional application No. 60/341,681, filed on Dec. 18, 2001.

(51) Int. Cl.
G06G 7/48 (2006.01)
(52) U.S. Cl. ............................................. 703/8; 280/5.5
(58) Field of Classification Search ..................... 703/8
See application file for complete search history.

(56) References Cited

U.S. PATENT DOCUMENTS

| | | | | |
|---|---|---|---|---|
| 3,770,292 A | * | 11/1973 | Palazzetti | 280/5.508 |
| 5,163,015 A | | 11/1992 | Yokota | 703/7 |
| 5,179,525 A | * | 1/1993 | Griffis et al. | 703/1 |
| 5,249,151 A | | 9/1993 | Chang et al. | 703/7 |
| 5,253,189 A | | 10/1993 | Kramer | 703/7 |
| 5,297,057 A | | 3/1994 | Kramer et al. | 703/7 |
| 5,623,642 A | | 4/1997 | Katz et al. | 703/7 |
| 5,654,900 A | | 8/1997 | Ratner | 703/1 |
| 5,797,191 A | * | 8/1998 | Ziegert | 33/503 |
| 5,901,072 A | | 5/1999 | Shimmell | 703/7 |
| 5,913,955 A | | 6/1999 | Redmond et al. | 82/1.11 |
| 5,920,491 A | | 7/1999 | Hibbitt et al. | 703/7 |
| 5,956,500 A | | 9/1999 | Shimmell | 703/7 |
| 6,022,005 A | * | 2/2000 | Gran et al. | 267/136 |
| 6,023,574 A | | 2/2000 | Tangren | 703/7 |
| 6,029,764 A | * | 2/2000 | Schubert | 180/89.13 |
| 6,044,210 A | | 3/2000 | Nagtegaal | 716/9 |
| 6,063,126 A | | 5/2000 | Borduin | 703/2 |
| 6,077,302 A | | 6/2000 | Kumra et al. | 703/7 |
| 6,081,654 A | | 6/2000 | Morman et al. | 703/1 |
| 6,112,866 A | * | 9/2000 | Boichot et al. | 188/299.1 |
| 6,132,108 A | | 10/2000 | Kashiwamura et al. | 703/2 |
| 6,161,080 A | | 12/2000 | Aouni-Ateshian et al. | 703/11 |
| 6,178,540 B1 | | 1/2001 | Lo et al. | 716/15 |

(Continued)

OTHER PUBLICATIONS

Turner, John; Hill, Martyn; "Instrumentation for Engineers and Scientists", 1999, Oxford University Press.*

(Continued)

*Primary Examiner*—Paul L Rodriguez
*Assistant Examiner*—Russ Guill
(74) *Attorney, Agent, or Firm*—Dykema Gossett PLLC

(57) ABSTRACT

A method for modeling a coil spring on a suspension system in terms of derived torque and force characteristics of the spring comprising the steps of providing a force field generator for simulating the spring, securing the force field generator to the suspension system, activating the force field generator to produce forces for characterizing the spring, measuring the forces; and deriving a spring design based upon the measured forces.

18 Claims, 7 Drawing Sheets

U.S. PATENT DOCUMENTS

| | | | |
|---|---|---|---|
| 6,224,249 B1 | 5/2001 | Ozawa et al. | 703/1 |
| 6,259,982 B1 * | 7/2001 | Williams et al. | 701/38 |
| 6,293,530 B1 * | 9/2001 | Delorenzis et al. | 267/64.13 |
| 6,293,561 B1 * | 9/2001 | Goetzen et al. | 280/5.52 |
| 2001/0020386 A1 | 9/2001 | Mancosu et al. | 73/146 |
| 2001/0032065 A1 | 10/2001 | Fujita | 703/8 |

OTHER PUBLICATIONS

S. Tosunoglu et al., "Development and demonstration of a teleoperated modular robot system", Dec. 1992, University of Texas at Austin.*

Byung-Ju Yi et al., "Geometric characteristics of antagonistic stiffness in redundantly actuated mechanisms", 1993, Proceedings of the 1993 IEEE International Conference on Robotics and Automation, pp. 654-661.*

Modeling of Coil Springs Using Parallel Mechanisms, Shinichi Nishizawa et al., Society of Automotive Engineers, Inc., 2000.

Modeling of Coil Springs Using Parallel Mechanisms, Akihiko Kumagai et al., SAE 2001 World Congress, Detroit, Michigan Mar. 5-8, 2001.

Development of L-Shaped Coil Spring to Reduce a Friction on the McPherson Strut Suspension System, Toshio Hamano et al., SAE 2001 World Congress, Detroit, Michigan, Mar. 5-8, 2001.

* cited by examiner

TARGET FORCE LINE POSITION

COMPARISON OF SIDE FORCE

METHOD AND APPARATUS FOR MODELING COIL SPRINGS USING A FORCE FIELD GENERATOR

RELATED APPLICATION

This application is related to Provisional Application Ser. No. 60/341,681, filed Dec. 18, 2001, the teachings of which are incorporated herein by reference.

BACKGROUND OF THE INVENTION

The invention pertains to a method and apparatus for modeling coil springs and in particular to a method employing a force field generator on a suspension system to simulate the actual coil spring behavior so that the spring and suspension system may be tested without making actual colt springs.

Traditionally, coil springs are used for applications to exert a one-dimensional force along a given coil spring axis. However, in recent years, there has been an increasing trend in which coil springs are designed to provide forces in multi-dimensional space. Such forces may be developed by means of a pitch control spring or an offset type suspension.

FIG. 1 is a schematic illustration of an automobile suspension 10 employing a McPherson strut 12. The McPherson strut is a well known device commonly used in modern automobile suspensions which employs a coil spring 14 and a damper 16. Typically, the spring and damper have coaxial central displacement axes A. As a result of the geometry of the suspension, the damper 16 receives a bending moment 18 which is transmitted by the tire 20 to the lower end of the strut through the suspension linkage 22, as shown. Bending moment 18 produces a side load 26 on the damper transverse to the strut displacement axis A, which results in a source of extra friction in the telescopic joint 28 of the damper 16. This results in diminished damper operation and riding discomfort. The coil spring may be designed to exert forces in directions parallel to as well as normal to the strut displacement axis (directions 28 and 30, respectively). In the design of the spring, the normal component of the spring force 30 may be tailored to reduce the side load 26 on the strut and thereby improve performance.

Finite element analysis (FEA) (sometimes referred to as Finite Element Modeling (FEM)) is a well-known tool for designing coil springs of the type referred to hereinabove. However, modern springs have specification requirements which tend to be more and more complicated. Accordingly, efforts are needed to develop new types of tools to supplement FEA or to provide new design development capability that cannot be accomplished by FEA.

A coil spring may be modeled as a mechanical device that produces force and torque between two planes between which the flat opposite ends of the spring are mounted. Hereinafter, the two planes are referred to as the lower and upper spring planes. In static and quasi-static force-torque analysis, each coil spring may be designed to have its own force and torque characteristics, which may be observed at a given spring plane after the kinematics relationship between the planes is established. In other words, the force torques and geometry of the model characterizes the spring.

A coil spring designer must often evaluate the performance of a spring developed by FEM within an integrated mechanical system environment containing the spring. This type of evaluation is usually performed through kinematics and dynamics computer simulation software packages. ADAMS and WORKING MODEL are two known examples. However, exporting a spring model developed by FEA into third party kinematics and dynamics simulation software packages is not always a smooth and convenient process. The FEA file must first be converted into a specific file format required by the particular simulation package to be used. This type of conversion is not always available. Further, even if a finite element analysis file is successfully exported, it may significantly increase the computational load of the simulation package.

A newly designed spring must often be tested not only through simulations but also by experiments. Building a physical prototype of a newly designed spring is costly and time consuming as well.

It would therefore be desirable to provide a model which would enable a designer to simulate spring characteristics without using an FEA feature. It is particularly desirable to employ such a model in an automobile suspension.

SUMMARY OF THE INVENTION

The present invention is based upon the discovery that a force field generator may be employed to model a coil spring to realize the spring force and torque characteristics. In an exemplary embodiment, a parallel mechanism comprising lower and upper platforms and a plurality of linkages, linking the platforms with a six degree freedom of mobility, in an automobile suspension, is employed to model the spring.

The method allows a designer to simulate spring behavior and test a suspension using such a spring without using finite element analysis techniques and without having to make a spring in order to perform the tests.

The method also permits the designer to physically realize the performance of a newly designed spring with its integrated mechanical system. For example, if a physical model is available, and if the characteristics of the new spring are realized, it is possible to test the performance of the new spring integrated in a mechanical suspension system without a physical prototype of the spring. In other words, it is possible to test the performance of the spring without making a spring.

In addition, the model may be employed to perform more complex and active experiments. For example, the model may be used to discover or characterize any desirable spring force and torque characteristics by generating various force-torque patterns in the model.

In an exemplary embodiment, the model employs a Stewart platform to produce an artificial force field of torques and forces for characterizing the spring and for manipulating the model.

DESCRIPTION OF THE INVENTION

Figure 1:
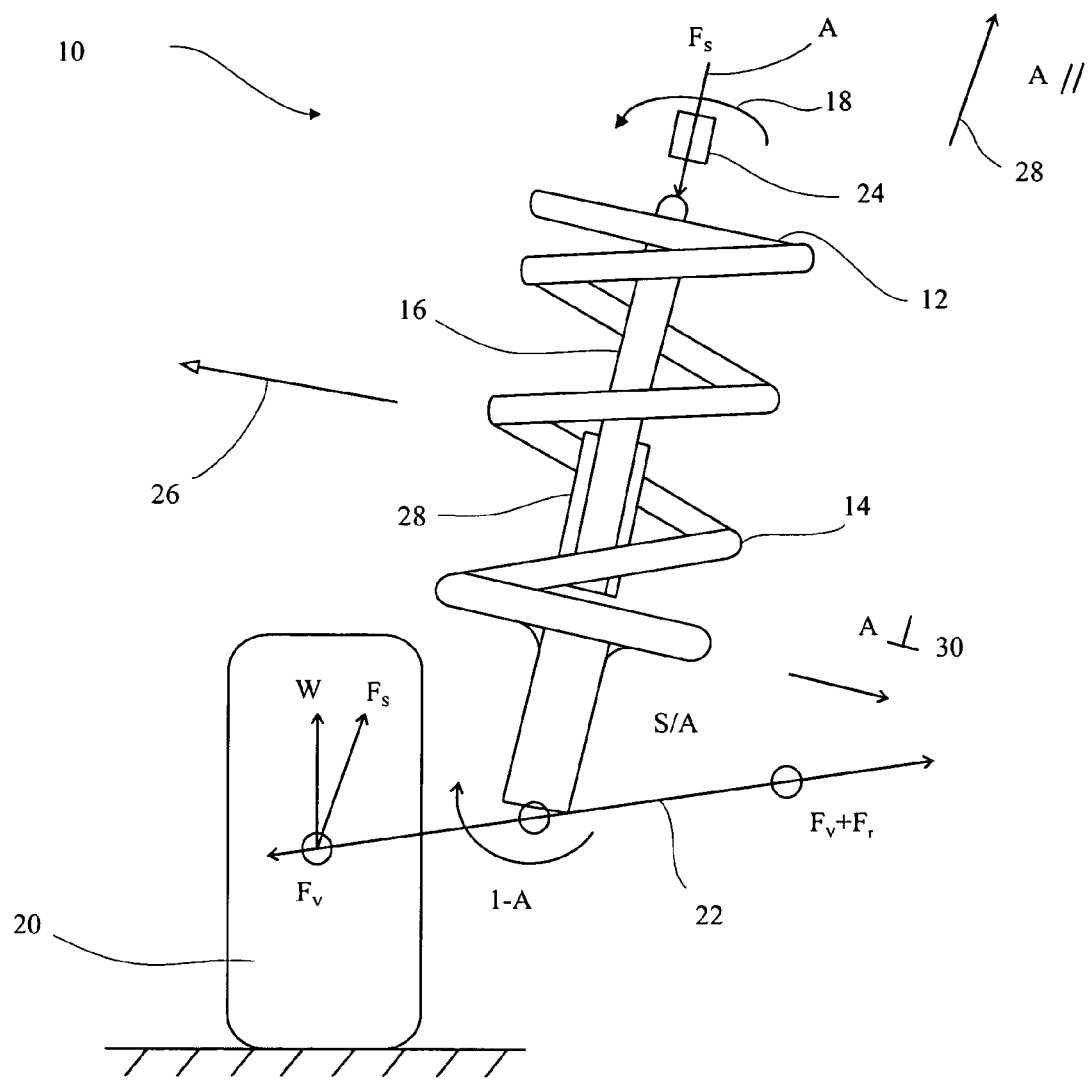
FIG. 1 is a schematic illustration of a known McPherson-type strut in an automobile suspension.
Figure 2:
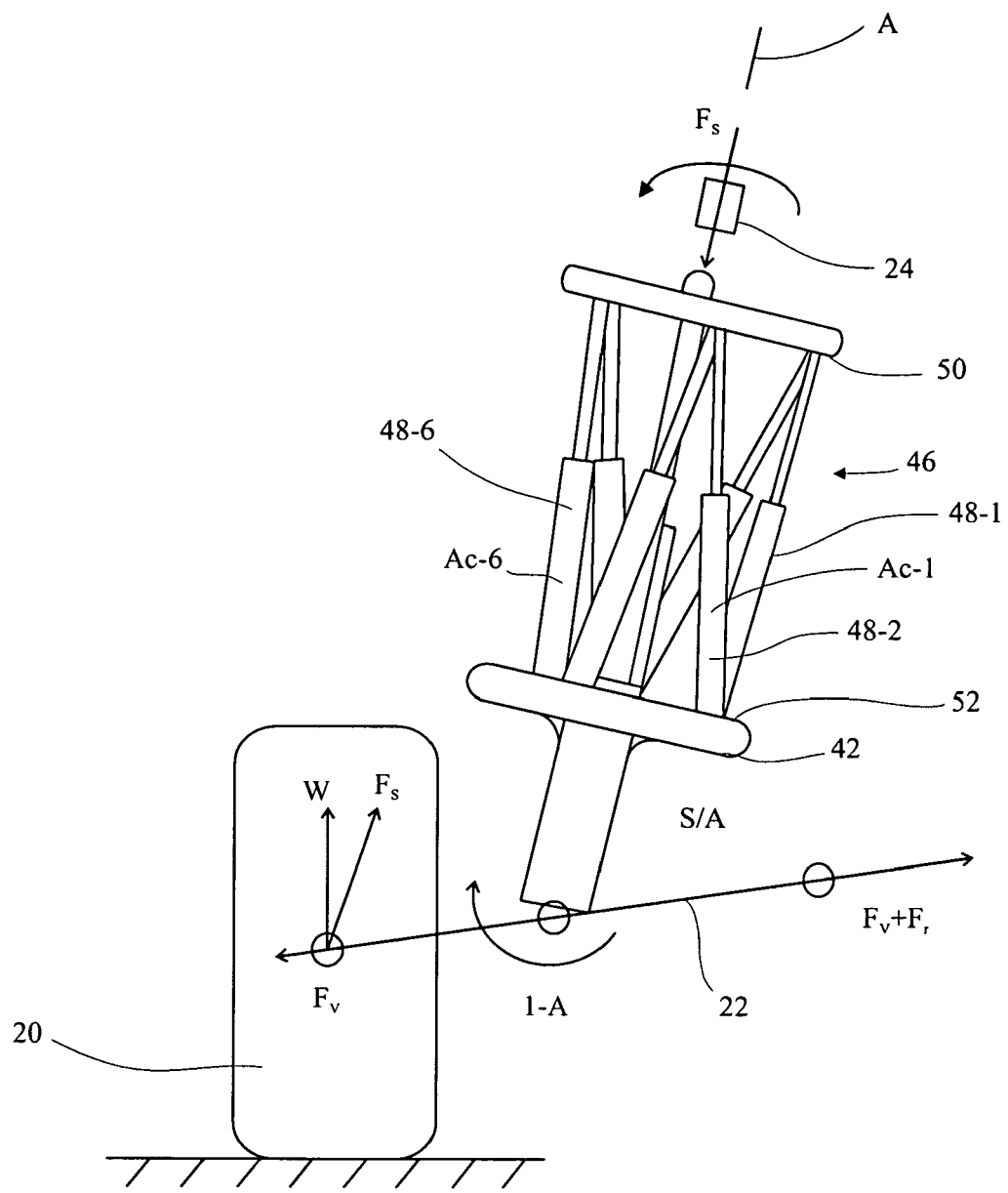
FIG. 2 is an exemplary force field generator employed as a spring model, according to the present invention, coupled to an automobile suspension.

A suspension 40, similar to the suspension 10 shown in FIG. 1, and wherein similar elements have the same reference numbers, is shown in FIG. 2. The suspension 40 employs a force field generator 42 for carrying out the method according to the invention. The mechanism 42, known as a Stewart Platform, employs a lower platform 44 having a central axis A secured to the lower suspension linkage 22 and fire 20 as shown; an upper platform 46 secured to the vehicle (not shown) via bushing 24 and a set of six linkages 48-1 . . . 48-6 linking the platforms with a six degree of freedom of mobility. Each linkage 48-1 . . . 48-6 has a corresponding central axis Ac-1 . . . Ac-6, and includes an upper end joint 50, a lower end joint 52 and an intermediate telescopic joint 34. Each upper and joint 50-1 . . . 50-6 may comprise a conventional universal joint secured to the upper platform 46 for rotation about corresponding orthogonal axes lying in a plane P1- . . . P6 for each corresponding linkage. Each plane P1 . . . P6 is normal to the corresponding central axis Ac-1 . . . Ac-6 of the associated link 48-1 . . . 48-6. The arrangement allows the linkage 48 to move relative to the upper platform 46 but not to rotate about the corresponding central axis AC for each link.

The lower link 52 may be connected to the lower platform 42 by a spherical or ball joint which has similar freedom as the upper joint. It is unnecessary to constrain the axial rotation of the lower spherical end as this is accomplished by means of the limited degree of freedom afforded by the universal joint employed in the upper end joint as discussed above. It is also possible to use spherical joints at either end of the links if an appropriate constraint is employed to avoid rotation of the links about their respective axes.

The intermediate link comprises a force actuator, such as a hydraulic cylinder, secured at opposite ends to the upper and lower joints as shown.

Figure 3:
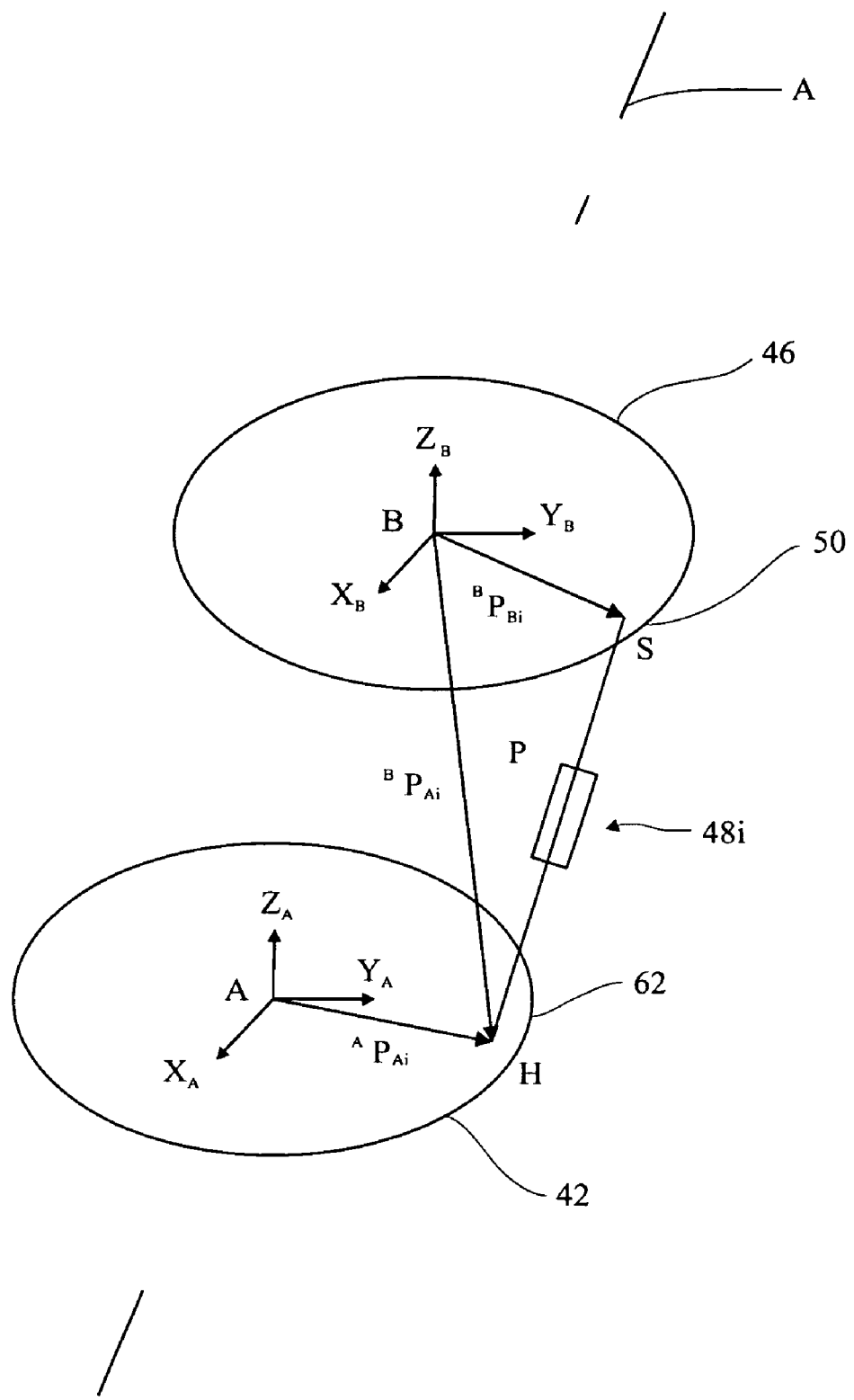
FIG. 3 is a schematic illustration of the geometric relationship between upper and lower plates of the parallel mechanism shown in FIG. 2.

FIG. 3 illustrates the kinematics of the force field generator 42 employed in the present invention. The fixed location of the lower joint 52 with respect to the lower platform 42 is indicated by the vector:

$$^{A}P_{Ai} = [^{A}x_{Ai}, ^{A}y_{Ai}, 0, 1]^{T}$$

The upper-left superscript of the vector indicates the frame of reference.

The fixed location of the upper joint 50 of the same leg with respect to the upper frame 42 is indicated by the vector:

$$^{B}P_{Bi} = [^{B}x_{Bi}, ^{B}y_{Bi}, 0, 1]^{T}$$

Let $_{A}^{B}T$ be the transformation matrix to represent the location and orientation of the lower frame 42 with respect to the upper frame 46.

Then the vector:

$$^{B}P_{Ai} = [^{B}x_{Ai}, ^{B}y_{Ai}, 0, 1]^{T}$$

which specifies the location of the lower joint of the $i^{th}$ leg with respect to the upper frame 46, is given by $$^{B}P_{Ai} = {_{A}^{B}T} \, ^{A}P_{Ai} \tag{1}$$

Let $B_{u_i}$ be the unit vector representing the direction of the $i^{th}$ leg from lower Joint 52 to upper joint 50 with respect to the upper frame 46. This unit vector is calculated as $$^{B}u_i = \frac{(^{B}x_{Bi} - ^{B}x_{Ai}, \, ^{B}y_{Bi} - ^{B}y_{Ai}, \, -^{B}z_{Ai})}{\sqrt{(^{B}x_{Bi} - ^{B}x_{Ai})^2 + (^{B}y_{Bi} - ^{B}y_{Ai})^2 + ^{B}z_{Ai}^2}} \tag{2}$$

Let F and M be the external force and torque vectors acting on the origin of frame 46. Let $f_i$ be the magnitude of the force along the $i^{th}$ leg. Neglecting the gravitational forces of all components of the mechanism 42, the force equilibrium based upon the quasi-static force analysis is given by $$\sum_{i=1}^{6} f_i \, ^{B}u_i + F = 0 \tag{3}$$

The moment of equilibrium given by $$\sum_{i=1}^{6} {^{B}P_{Bi}} \times f_i \, ^{B}u_i + M = 0 \tag{4}$$

Because equations (3) and (4) contain three components, there are a total of six equations to solve for six unknown forces $f_1, f_2, \ldots f_6$.

Figure 4A:
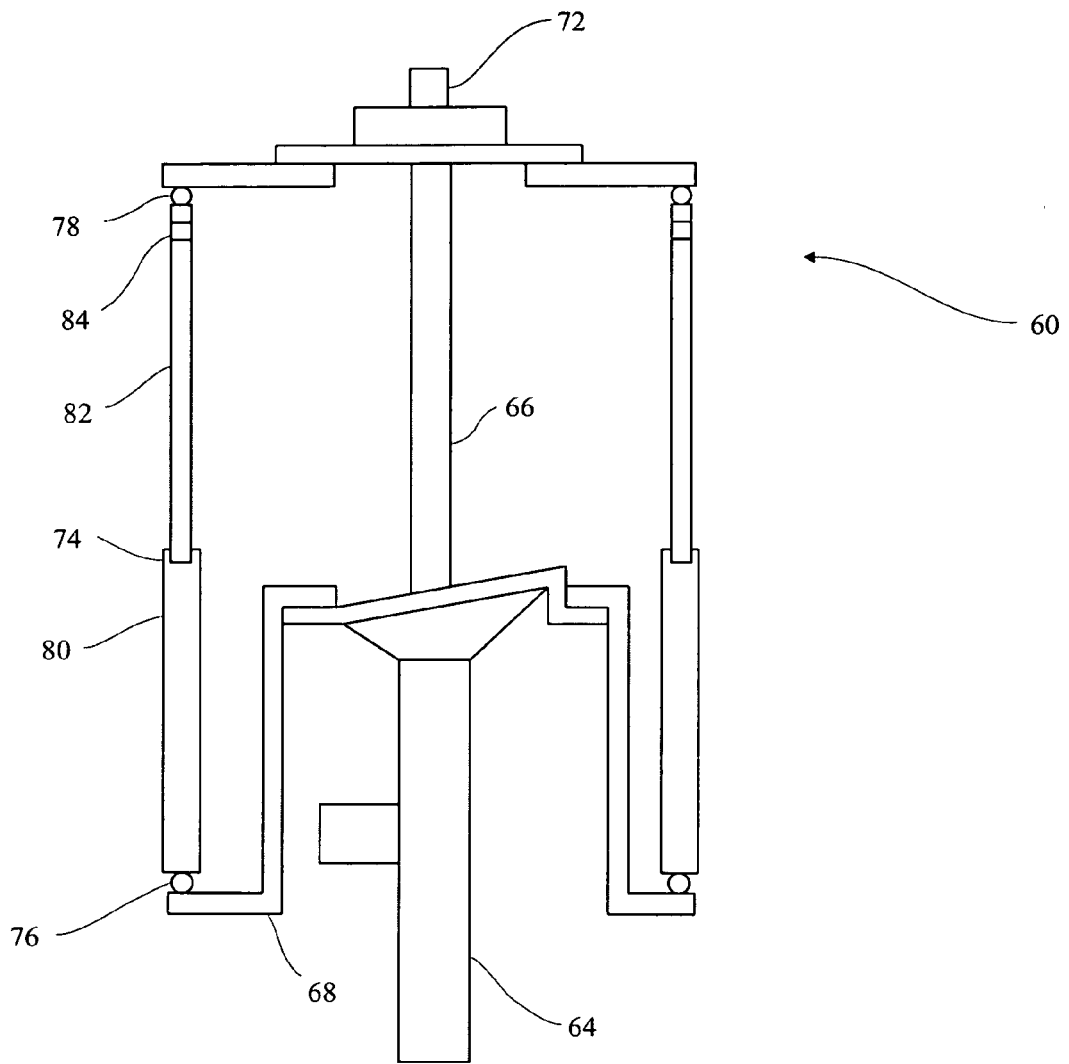
FIGS. 4a and 4b are schematic side sectional elevations of positions of the mechanism shown in FIG. 2 in extended and compressed states, respectively.
Figure 4B:
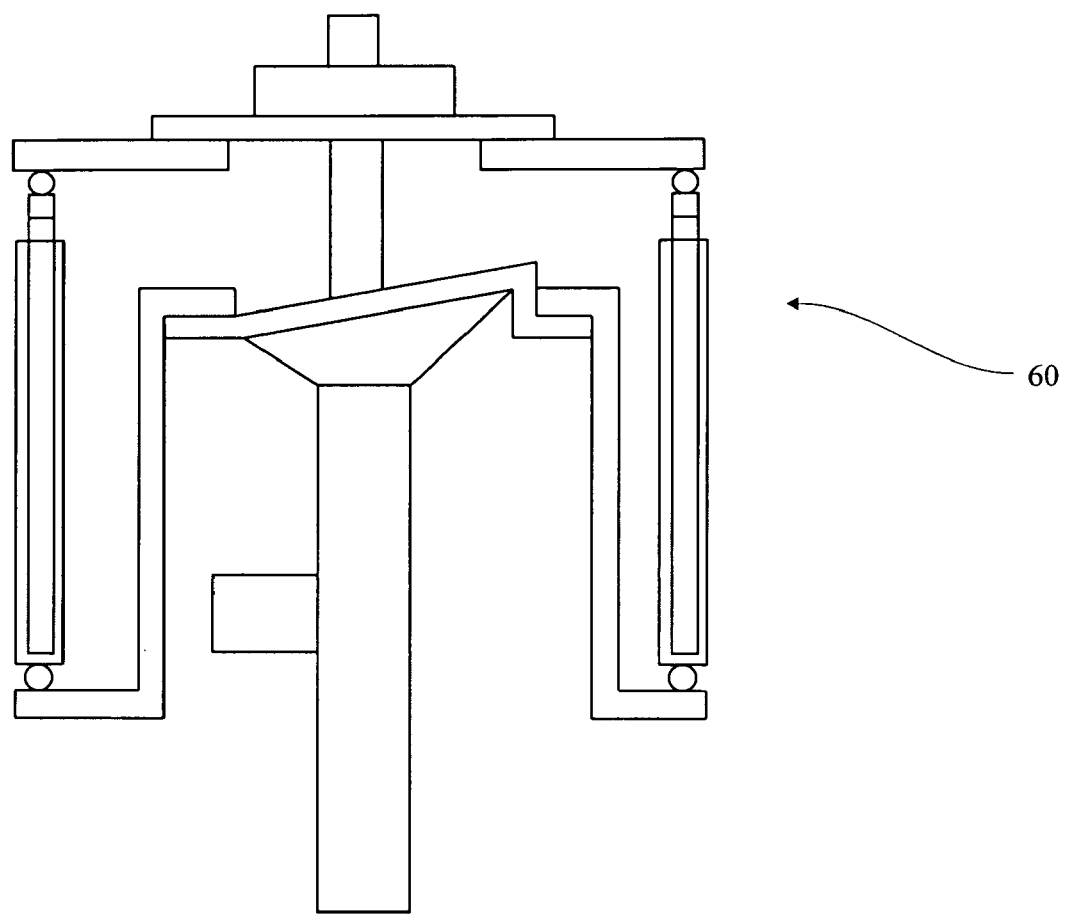

FIGS. 4a and 4b illustrate an exemplary force field generator which is similar to the arrangement illustrated in FIG. 2. In FIG. 4a, the force field generator 60 is fully extended and in FIG. 4b, the force field generator is shown fully compressed. The exemplary force field generator 60 includes a damper 62 having a housing 64 and a rod 66 telescopically mounted therein. A lower plate 68 is secured to the housing 64 and upper plate 70 is secured to a free end 72 of the shaft 66. A plurality of hydraulic cylinders 74 are secured between the lower and upper plates 68 and 70 by corresponding lower and upper spherical joints 76 and 78, respectively. A schematic illustration only two hydraulic cylinders 74 are shown for clarity. It should be understand that, in an exemplary embodiment, six hydraulic cylinders are employed in an arrangement similar to that illustrated in FIG. 2.

The hydraulic cylinder 74 includes a housing portion 80 and a shaft portion 82 telescopically secured therein. A force sensor 84 may be located on the shaft 82. The force sensor may be a strain gauge which senses the force exerted by the hydraulic cylinder between the lower and upper plates 68 and 70.

Figure 5:
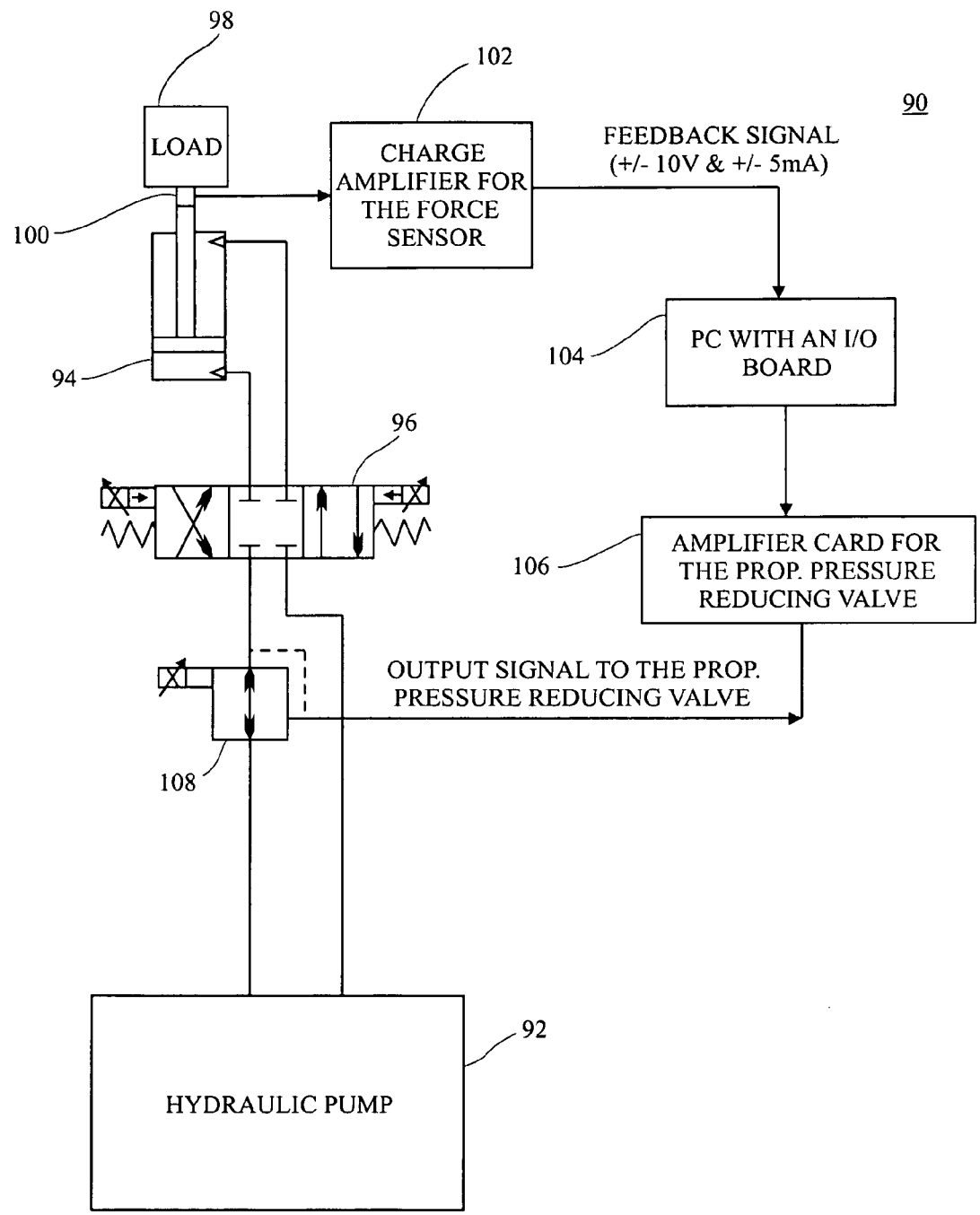
FIG. 5 is a schematic of a hydraulic circuit for controlling the hydraulic cylinders generating the forces and torques in the model.

FIG. 5 illustrates an exemplary hydraulic circuit for operating the hydraulic cylinders shown in FIGS. 4a and 4b. The hydraulic circuit 90 includes a hydraulic pump 92 which is coupled to hydraulic cylinder 94 through a control valve 96, as shown. The cylinder 94 is connected to a load 98 which may be represented by the opposed upper and lower plates, and a force sensor 100 is secured between the cylinder 94 and the load 98. The force sensor produces an output which is coupled to an amplifier 102 which provides a feedback signal as an input to a PC having an input/output board 104. The output of the I/O board 104 is coupled to an amplifier circuit 106, which provides feedback to a proportional pressure reducing valve 108 which is coupled in the fluid circuit between the hydraulic pump 92 and the cylinder 94. The arrangement in FIG. 5 may be used to control the forces on the load exerted by each of the cylinders and in this way a spring may be modeled or characterized by the forces produced by the hydraulic cylinders.

Figure 6:
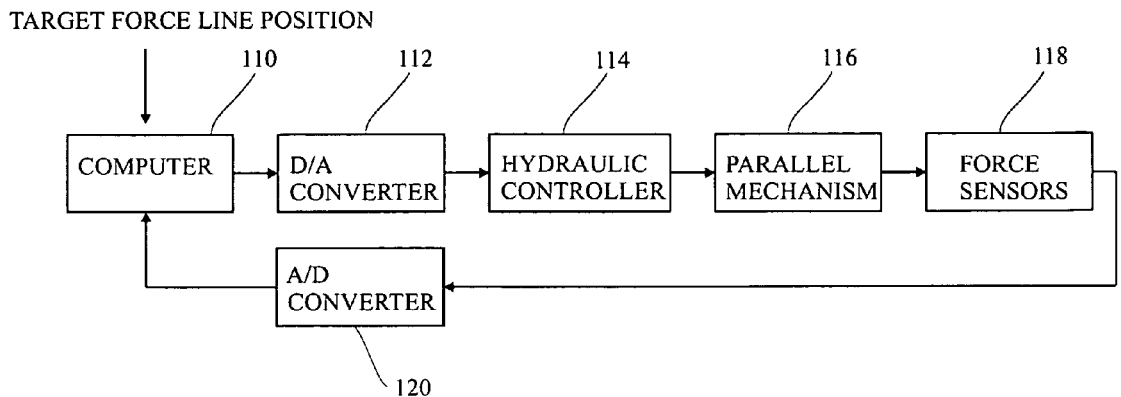
FIG. 6 is a schematic block diagram illustrating the control loop for operating the hydraulic circuit of FIG. 5.

FIG. 6 illustrates the feedback circuit in further detail. A computer 110 produces a digital output which is converted in D/A converter 112 to an analog signal which in turn is coupled to hydraulic controller 114. The hydraulic converter 114 controls the force field generator 116. Force sensors 118 in the force field generator 116 produce output signals which are coupled to the computer via D/A converter 120 as illustrated. The computer may be programmed to control the hydraulic controller 114 in order to produce selected forces in the cylinders.

The force field generator described herein may be employed to realize spring characteristics by adjusting the axial forces on the cylinders.

Figure 7:
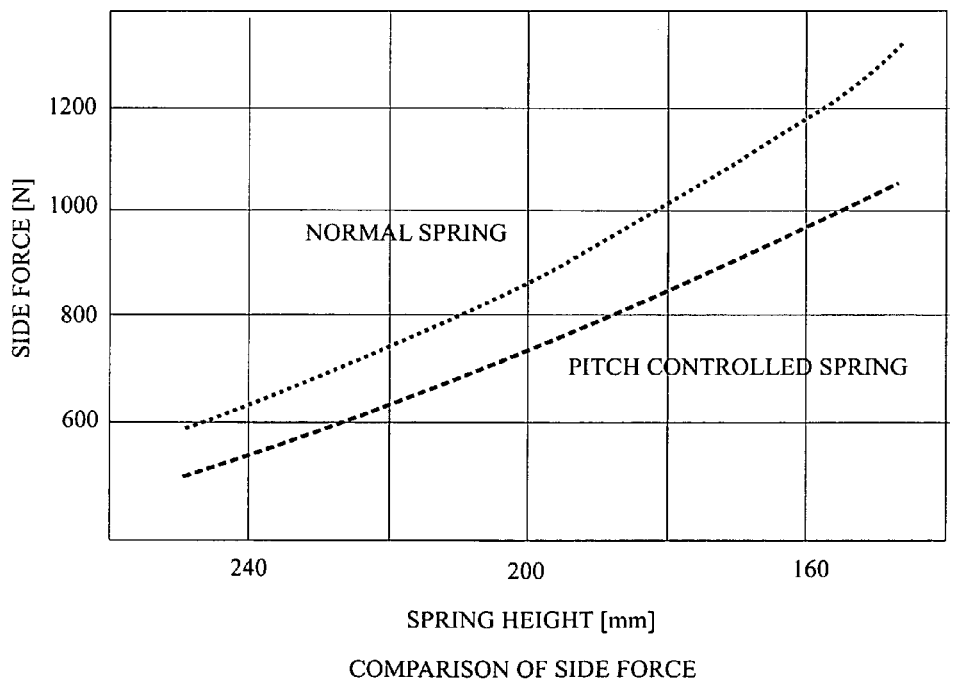
FIG. 7 is a comparison of the side force in a normal spring and in a pitch controlled spring designed using the model of FIG. 2.

Referring to FIGS. 1, 2 and 7, the side force 26 is that force which results from the moment produced by the suspension system. The side force in a conventional spring is illustrated in FIG. 7, which is a plot of the side force versus the spring height. In accordance with the invention, a spring may be modeled to produce a desired side force. If the spring is produced with a uniform pitch, the spring characteristic may be exemplified by the corresponding curve in FIG. 7. If the spring is designed with a non-uniform pitch, the side force may be modified and in fact lowered in accordance with the curve illustrated in FIG. 7 and labeled pitch control spring. In accordance with the invention, the pitch control spring may be designed to further reduce the side force and thereby improve the performance of the suspension.

In accordance with the invention, two kinds of spring shape may be prepared for finite element modeling in accordance with a given specification for the spring. For example, the spring may have a free height of 400 mm, a coil diameter of 150 mm, a wire diameter of 13 mm and 45.5 of turns. Using this specification, a reaction force vector for each spring may be computed using a MARC program. The reaction force vector is then converted into the six axial forces of the force generator by solving equations 3 and 4 above. These are then implemented in an ADAMS model with 3D spline interpolation.

When the side force acts on the damper, the pressure is concentrated on the sealed portion of the damper. This causes an increase in friction. Therefore, it is important to measure the side force at the sealed location which is defined as the inlet of the piston to the cylindrical tube. The simulation is carried out by moving the tire 20 upward which the degrees of freedom of the force field generator 42 are constrained. When all the forces on the cylinders are sensed, the side force is calculated. The side force may be that associated with a normal spring or a pitch control spring, the latter reducing the side force due to the countervailing moment produced by such a spring. As illustrated, the pitch control spring cancels a portion of the bending moment acting on the damper and as a result, the magnitude of the side vector 22 is also smaller than one with a normal spring. By suitable manipulation of the variables, the side force produced by the normal spring in the pitch control spring may be optimized for the system.

A similar characterization of the spring may be developed in which the axis of the spring and the axis of the damper are separately controlled. Such an arrangement is illustrated in an article entitled "Development of L-shaped Coil Spring to Reduce Friction on the McPherson Strut Suspension System" published on Mar. 5-8, 2001 by Hamano et al., a copy of which is attached hereto and is incorporated by reference.

While there has been described what are presently considered to be the exemplary embodiments of the invention, it will be apparent to those skilled in the art that various modifications may be made therein without departing from the invention and it is intended in the appended claims to cover such changes and modifications that fall within the spirit and scope of the invention.

We claim:

1. A method for modeling a coil spring on a suspension system in terms of derived torque and force characteristics of the coil spring, said method comprising the steps of:
   providing a physical six degree of freedom force field generator for simulating the spring;
   securing the force field generator to the suspension system;
   activating the force field generator to produce forces for characterizing six degree of freedom spring reaction forces;
   measuring suspension characteristics; and
   deriving a coil spring design specification based upon the measured characteristics.

2. The method according to claim 1, wherein the force field generator comprises a Stewart platform.

3. A method for modeling a coil spring in terms of torque and force characteristics to produce a spring design for an automobile suspension, said method comprising the steps of:
   assembling a physical six degree of freedom mechanism having spaced apart moveable platforms and a plurality of actuable links interconnecting the platforms at corresponding joints on opposite ends of each link;
   specifying a kinematics relationship between the platforms and the links;
   applying the mechanism to the automobile suspension;
   actuating the links to generate corresponding applied forces and torques at each joint;
   measuring the applied forces and torques; and
   deriving the force and torque characteristics of the coil spring to be designed based upon the kinematics relationship and the corresponding applied forces and torques at each joint.

4. The method according to claim 3, wherein the platforms are in spaced apart parallel relationship having confronting parallel support surfaces corresponding to opposite ends of the spring to be modeled.

5. The method according to claim 3, wherein the actuable links employ at least one universal joint.

6. The method of claim 3, wherein the actuable links employ at least one ball joint.

7. The method of claim 3, wherein specifying a kinematics relationship between the platforms and the links comprises deriving a vectorial relationship between each link and the platforms.

8. The method of claim 7, wherein establishing the vectorial relationships includes deriving force and torque vectors acting on the mechanism by one of said platforms with respect to another one of said platforms.

9. The method of claim 3, further comprising the step of: adjusting the forces applied to each actuable link.

10. The method of claim 3, further comprising the step of: designing the spring in accordance with the derived force and torque characteristics.

11. The method of claim 10, wherein the coil spring has a variable pitch and the step of: designing the spring comprises selecting a pitch for the spring for producing a resulting side force in the spring.

12. The method of claim 3 wherein the platforms are movable between rest and compressed positions and the deriving step includes the step of computing the force and torque characteristics while the platforms are compressed.

13. The method of claim 12, comprising the step of: computing force and torque vectors employing Finite Element Analysis software.

14. The method of claim 13, wherein computing the force and torque vectors comprises the step of: employing kinematics software.

15. The method of claim 14, comprising the step of: converting the computed force and torque vectors for each link into axial forces employing a cubic spline interpolation.

16. The method of claim 3, further comprising simulating in at least one of Finite Element Analysis and kinematics simulation software.

17. A system for modeling a coil spring on a suspension system in terms of derived torque and force characteristics of the coil spring, said system comprising:
- a physical six degree of freedom force field generator for simulating the spring, wherein the force field generator is secured to the suspension system and is activated to produce forces for characterizing six degree of freedom spring reaction forces;
- at least one force sensor for measuring suspension characteristics; and
- a sub-system for deriving a coil spring design specification based upon the measured characteristics.

18. A system for modeling a coil spring in terms of torque and force characteristics to produce a spring design for an automobile suspension, said system comprising:
- a physical six degree of freedom mechanism having spaced apart moveable platforms and a plurality of actuable links interconnecting the platforms at corresponding joints on opposite ends of each link, wherein the platforms and the links include a kinematics relationship, wherein the mechanism being applied to the automobile suspension, and wherein the links are actuated to generate corresponding applied forces and torques at each joint;
- at least one force sensor for measuring the applied forces and torques; and
- a sub-system for deriving the force and torque characteristics of the coil spring to be designed based upon the kinematics relationship and the corresponding applied forces and torques at each joint.

* * * * *